United States Patent
Goo

(10) Patent No.: US 10,742,103 B2
(45) Date of Patent: Aug. 11, 2020

(54) APPARATUS FOR OPERATING AS DC MOTOR AND DC GENERATOR

(71) Applicant: Jei Hyun Goo, Seoul (KR)

(72) Inventor: Jei Hyun Goo, Seoul (KR)

( * ) Notice: Subject to any disclaimer, the term of this patent is extended or adjusted under 35 U.S.C. 154(b) by 19 days.

(21) Appl. No.: 16/376,365

(22) Filed: Apr. 5, 2019

(65) Prior Publication Data

US 2019/0238037 A1  Aug. 1, 2019

Related U.S. Application Data

(63) Continuation-in-part of application No. PCT/KR2018/006339, filed on Jun. 4, 2018.

(30) Foreign Application Priority Data

Jun. 22, 2017 (KR) .................. 10-2017-0078903

(51) Int. Cl.

| | |
|---|---|
| *H02K 21/14* | (2006.01) |
| *H01F 7/122* | (2006.01) |
| *H02K 53/00* | (2006.01) |
| *H02K 11/33* | (2016.01) |
| *H01F 7/14* | (2006.01) |
| *H02K 21/12* | (2006.01) |
| *H01F 7/06* | (2006.01) |
| *H02K 11/22* | (2016.01) |

(Continued)

(52) U.S. Cl.
CPC ............. *H02K 21/14* (2013.01); *G05F 1/613* (2013.01); *H01F 7/06* (2013.01); *H01F 7/122* (2013.01); *H01F 7/14* (2013.01); *H02J 7/007* (2013.01); *H02K 11/22* (2016.01); *H02K 11/33* (2016.01); *H02K 21/12* (2013.01); *H02K 53/00* (2013.01); *H02P 7/04* (2016.02)

(58) Field of Classification Search
CPC ........ H02K 21/14; H02K 11/33; H02K 11/22; H02K 21/12; H02K 53/00; H02J 7/00; H02J 7/007; H02P 7/04; H02P 7/03; H01F 7/06; H01F 7/14; H01F 7/122; G05F 1/613

See application file for complete search history.

(56) References Cited

U.S. PATENT DOCUMENTS

| | | | | |
|---|---|---|---|---|
| 4,613,761 A | * | 9/1986 | Yabunaka | ............... H02K 7/003 290/36 R |
| 6,777,838 B2 | | 8/2004 | Miekka et al. | |
| 7,538,524 B2 | * | 5/2009 | Sullivan | ................... H02K 1/02 310/154.01 |

FOREIGN PATENT DOCUMENTS

| | | |
|---|---|---|
| TW | I636642 B | 9/2018 |
| WO | 01/052390 A1 | 7/2001 |
| WO | 2015/142084 A1 | 9/2015 |

OTHER PUBLICATIONS

Written Opinion, dated Sep. 26, 2018, for International Application No. PCT/KR2018/006339.

* cited by examiner

*Primary Examiner* — Naishadh N Desai
(74) *Attorney, Agent, or Firm* — LRK Patent Law Firm

(57) ABSTRACT

An apparatus for operating as DC motor and DC generator is provided. Two permanent magnets are placed to be able to rotate with a shaft and one coil is placed outside the circumference of the permanent magnets and one device for making electric current flow in the coil is placed. Two secondary cell batteries are used to supply electric current to the coil. The secondary cell batteries are charged by using back-emf which occurs in the coil. If the shaft rotates without using the secondary cell batteries, the secondary cell batteries are charged by the rotating permanent magnets.

3 Claims, 4 Drawing Sheets

(51) Int. Cl.
*G05F 1/613* (2006.01)
*H02J 7/00* (2006.01)
*H02P 7/03* (2016.01)

US 10,742,103 B2

APPARATUS FOR OPERATING AS DC MOTOR AND DC GENERATOR

CROSS-REFERENCE TO RELATED APPLICATIONS

This application is a continuation-in-part of International Application No. PCT/KR2018/006339, filed Jun. 4, 2018, which claims priority to Korean Patent Application No. 10-2017-0078903, filed Jun. 22, 2017, the disclosures of which are incorporated by reference herein in their entirety.

BACKGROUND OF THE INVENTION

1. Field of the Invention

The present invention relates to an apparatus for operating as DC motor and DC generator. More specifically, two permanent magnets are placed to be able to rotate with a shaft and a coil is placed outside the circumference of the permanent magnets and a device for making electric current flow in the coil is placed. Two secondary cell batteries are used to supply electric current to the coil. The secondary cell batteries are charged by using back-emf which occurs in the coil. If the shaft rotates without using the secondary cell batteries, the secondary cell batteries are charged by the rotating permanent magnets.

2. Description of Related Art

In an electronic circuit using a relay, a transistor which is used as a switch is connected to a terminal of the relay and the transistor is connected to the negative side of a battery. As the battery is connected to the relay and disconnected, a voltage higher than the battery voltage occurs momentarily to the relay. This voltage damages the transistor. In order to solve this problem, a diode is used in which the anode of the diode is connected to the relay of which a terminal is connected to the negative side of the battery and the cathode of the diode is connected to the relay of which another terminal is connected to the positive side of the battery. By doing this, the electricity that occurs to the relay flows from the anode of the diode to the cathode thereof. In other words, a high voltage occurs momentarily to the relay of which the terminal is disconnected from the negative side of the battery and so electrons at the relay of which the terminal is connected to the positive side of the battery flow from the cathode of the diode to the anode thereof and flow to the relay. The high voltage to the relay is back-emf that occurs to the relay as the battery is connected to the relay and disconnected.

As a battery is connected to a coil, electrons flow from the negative terminal of the battery to the positive terminal of the battery. As the coil is disconnected from the negative terminal of the battery, electrons do not flow anymore from the negative terminal of the battery to the coil and electrons continue to flow to the positive terminal of the battery and electrons in the coil continue to move forward by the magnetic force of the coil. Within the coil, electrons start to disappear from the terminal which is disconnected from the negative terminal of the battery. Therefore, the number of electrons in the side which is connected to the positive terminal of the battery and the number of electrons in the side which is disconnected from the negative terminal of the battery are different and the difference changes. The difference in the number of electrons of two sides becomes bigger and then becomes smaller. The difference in the number of electrons which occurs in the coil is back-emf. The back-emf becomes bigger and reaches its peak as the difference in the number of electrons of two sides is largest (that is, as electrons exist only in a half of the coil). And then it becomes smaller and disappears.

The voltage of a coil becomes higher than the voltage of a secondary cell battery (secondary cell battery-1) instantly by back-emf which occurs to the coil as the secondary cell battery-1 is disconnected from the coil. If both the positive terminal and the negative terminal of the secondary cell battery-1 are disconnected from both terminals of the coil, the coil becomes a power source instantly and the terminal (terminal B) which is disconnected from the negative terminal of the secondary cell battery-1 becomes the positive terminal and the terminal (terminal A) which is disconnected from the positive terminal of the secondary cell battery-1 becomes the negative terminal. If electrons can flow from the positive terminal of another secondary cell battery (secondary cell battery-2) to the terminal B of the coil but cannot flow reversely and electrons can flow from the terminal A of the coil to the negative terminal of the secondary cell battery-2 but cannot flow reversely, then electrons flow from the positive terminal of the secondary cell battery-2 to the negative terminal of the secondary cell battery-2 and the secondary cell battery-2 is charged.

Then after a while, if the positive terminal of the secondary cell battery-1 is connected to the terminal A of the coil, electrons flow from the coil to the positive terminal of the secondary cell battery-1. And electrons flow from the positive terminal of the secondary cell battery-2 to the terminal B of the coil by the back-emf which occurs to the coil.

By doing this, the coil activates and the power consumption of the secondary cell battery-1 is reduced and the secondary cell battery-2 is charged by the back-emf which occurs to the coil In WO 2015/142084 A1 (24 Sep. 2015) (KR 10-1733373 B1 (8 Mar. 2017)), the negative terminal of a secondary cell battery is disconnected from an electromagnet. Electrons which flowed to the electromagnet continue to flow to the positive terminal of the secondary cell battery as the electromagnet is disconnected from the negative terminal of the secondary cell battery. By back-emf which occurs to the electromagnet, electrons in a capacitor flow to the electromagnet and also electrons flow from the positive terminal of the secondary cell battery to the capacitor and the electromagnet. The electrons which flowed to the electromagnet continue to flow to the positive terminal of the secondary cell battery.

SUMMARY OF INVENTION

An object of the present invention is to rotate a shaft by using two permanent magnets and a coil and two secondary cell batteries and to reduce the power consumption of the secondary cell batteries by using back-emf which occurs to the coil. Also, another object of the present invention is to charge the secondary cell batteries by the rotating permanent magnets if the shaft rotates without using the secondary cell batteries.

In order to accomplish the above object, there is provided an apparatus for operating as DC motor and DC generator which includes:

permanent magnets (101, 102) which are placed to be able to rotate with a shaft wherein N pole of one of the permanent magnets faces the shaft and S pole of another of the permanent magnets faces the shaft;

a coil (201) which is placed outside the circumference of the permanent magnets;

secondary cell batteries (501, 502) which supply DC electric current;

a rotating component P (301) which is provided on the shaft and used to repeatedly pass and block light of a first photointerrupter (11) to repeatedly connect and disconnect a positive terminal of a first one (501) of the secondary cell batteries to and from a terminal A of the coil, and can be used to repeatedly pass and block light of the first photointerrupter (11) to repeatedly connect and disconnect a negative terminal of the first secondary cell battery (501) to and from a terminal B of the coil, and used to repeatedly pass and block light of a third photointerrupter (21) to repeatedly connect and disconnect a positive terminal of a second one (502) of the secondary cell batteries to and from the terminal B of the coil, and can be used to repeatedly pass and block light of the third photointerrupter (21) to repeatedly connect and disconnect a negative terminal of the second secondary cell battery (502) to and from the terminal A of the coil;

a rotating component N (302) which is provided on the shaft and used to repeatedly pass and block light of a second photointerrupter (12) to repeatedly connect and disconnect the negative terminal of the first secondary cell battery (501) to and from the terminal B of the coil, and used to repeatedly pass and block light of a fourth photointerrupter (22) to repeatedly connect and disconnect the negative terminal of the second secondary cell battery (502) to and from the terminal A of the coil; and a device (401) for making electric current flow in the coil, wherein the positive terminal of the first secondary cell battery and the terminal A of the coil are connected through a first P channel FET switch (13), the terminal B of the coil and the negative terminal of the first secondary cell battery are connected through a first N channel FET switch (14), the positive terminal of the second secondary cell battery and the terminal B of the coil are connected through a second P channel FET switch (23), and the terminal A of the coil and the negative terminal of the second secondary cell battery are connected through a second N channel FET switch (24), wherein a cathode of a first diode (15) is connected to the positive terminal of the first secondary cell battery (501) and an anode of the first diode is connected to the terminal A of the coil, a cathode of a second diode (16) is connected to the terminal B of the coil and an anode of the second diode is connected to the negative terminal of the first secondary cell battery (501), a cathode of a third diode (25) is connected to the positive terminal of the second secondary cell battery (502) and an anode of the third diode is connected to the terminal B of the coil, a cathode of a fourth diode (26) is connected to the terminal A of the coil and an anode of the fourth diode is connected to the negative terminal of the second secondary cell battery (502), wherein the first P channel FET switch is turned on as the light of the first photointerrupter is passed by the rotating component P and the first P channel FET switch is turned off as the light of the first photointerrupter is blocked by the rotating component P, the first N channel FET switch is turned on as the light of the second photointerrupter is passed by the rotating component N and the first N channel FET switch is turned off as the light of the second photointerrupter is blocked by the rotating component N, the first N channel FET switch can be turned on as the light of the first photointerrupter is passed by the rotating component P and the first N channel FET switch can be turned off as the light of the first photointerrupter is blocked by the rotating component P, the second P channel FET switch is turned on as the light of the third photointerrupter is passed by the rotating component P and the second P channel FET switch is turned off as the light of the third photointerrupter is blocked by the rotating component P, the second N channel FET switch is turned on as the light of the fourth photointerrupter is passed by the rotating component N and the second N channel FET switch is turned off as the light of the fourth photointerrupter is blocked by the rotating component N, the second N channel FET switch can be turned on as the light of the third photointerrupter is passed by the rotating component P and the second N channel FET switch can be turned off as the light of the third photointerrupter is blocked by the rotating component P, and wherein the following routines A and B are alternately performed as the rotating components P and N rotate, routine A: ① both the first P channel FET switch and the first N channel FET switch are turned on and the coil (201) is activated by the first secondary cell battery (501), and ② both the first P channel FET switch and the first N channel FET switch are turned off, wherein the first P channel FET switch and the first N channel FET switch are set to turn-on to make electric current flow in the coil (201) at a position where the first permanent magnet (101) starts to face a side L of the coil, wherein electrons flow from the positive terminal of the second secondary cell battery (502) to the terminal B of the coil and also flow from the terminal A of the coil to the negative terminal of the second secondary cell battery (502) by back-emf which occurs in the coil (201), and wherein the routine A is repeated while the first permanent magnet (101) faces the L side of the coil, and routine B: ① both the second P channel FET switch and the second N channel FET switch are turned on and the coil (201) is activated by the second secondary cell battery (502), and ② both the second P channel FET switch and the second N channel FET switch are turned off, wherein the second P channel FET switch and the second N channel FET switch are set to turn-on to make electric current flow in the coil (201) at a position where the second permanent magnet (102) starts to face the L side of the coil, wherein electrons flow from the positive terminal of the first secondary cell battery (501) to the terminal A of the coil and also flow from the terminal B of the coil to the negative terminal of the first secondary cell battery (501) by back-emf which occurs in the coil (201), and wherein the routine B is repeated while the second permanent magnet (102) faces the L side of the coil.

DETAILED DESCRIPTION OF THE INVENTION

A desirable embodiment of the present invention is described by way of example with reference to the accompanying drawings.

Figure 1:
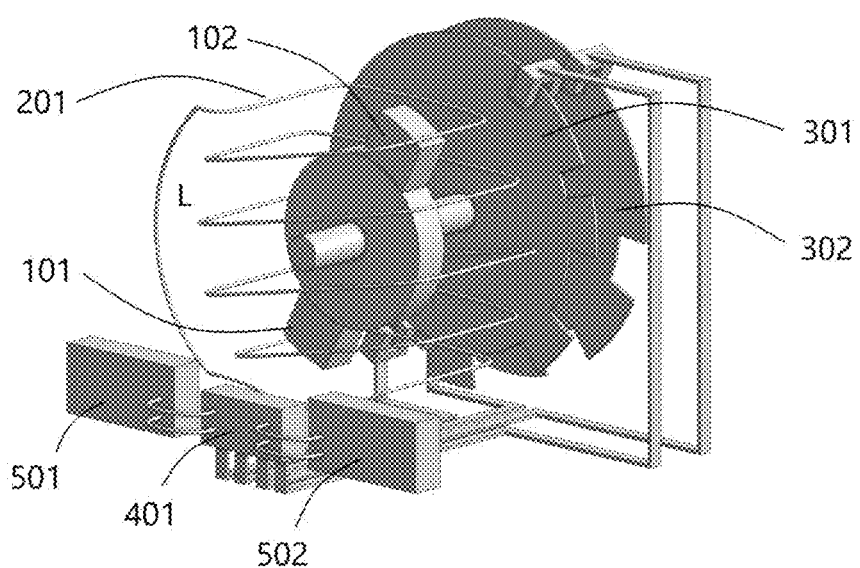
FIG. 1 is a perspective view that illustrates a configuration of an apparatus for operating as DC motor and DC generator according to an embodiment of the present invention.
Figure 2:
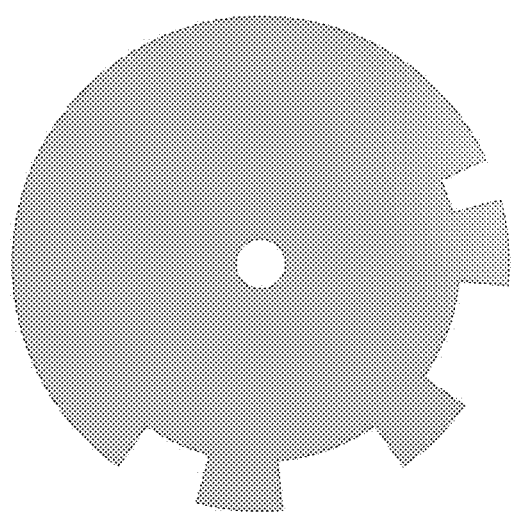
FIG. 2 illustrates a rotating component P to be used for passing and blocking the light of a photointerrupter repeatedly in order to connect the positive terminal of a secondary cell battery to a terminal of a coil and to disconnect them repeatedly in a device for making electric current flow in the coil.
Figure 3:
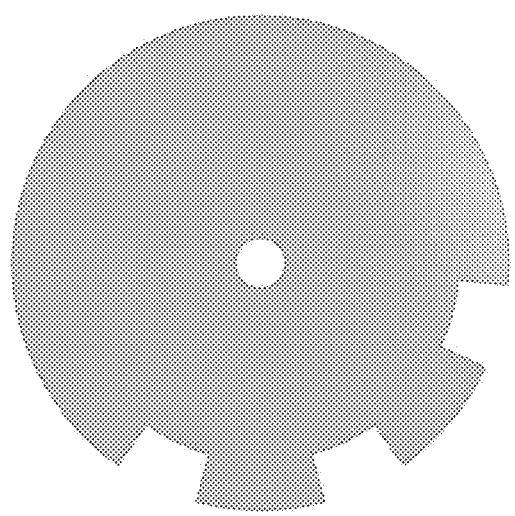
FIG. 3 illustrates a rotating component N to be used for passing and blocking the light of another photointerrupter repeatedly in order to connect the negative terminal of a secondary cell battery to another terminal of the coil and to disconnect them repeatedly in a device for making electric current flow in the coil.
Figure 4:
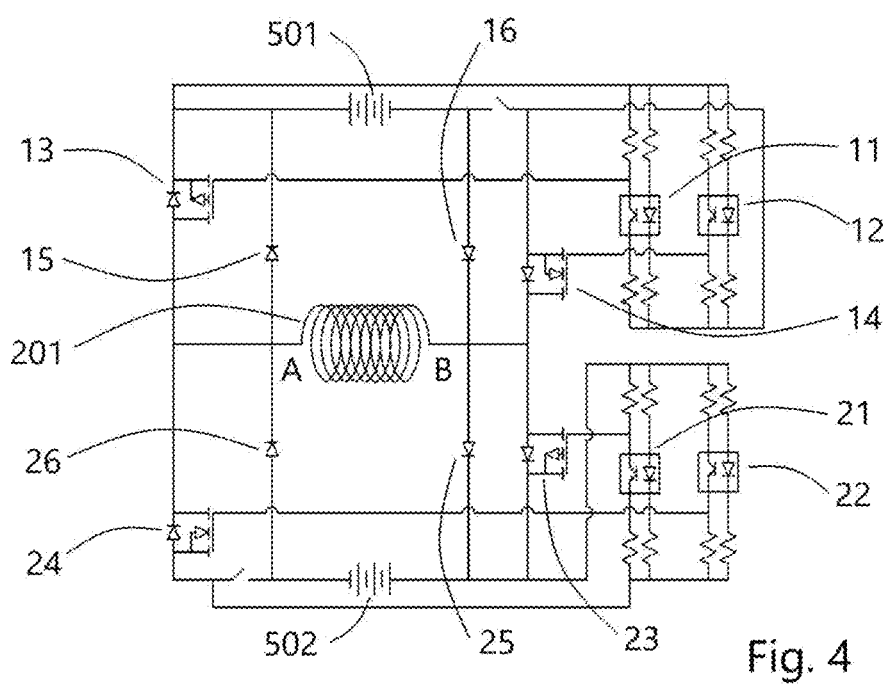
FIG. 4 is an electronic circuit of a device for making electric current flow in the coil.

FIG. 1 is a perspective view that illustrates a configuration of an apparatus for operating as DC motor and DC generator according to an embodiment of the present invention. FIG. 2 illustrates a rotating component P to be used for passing and blocking the light of a photointerrupter repeatedly in order to connect the positive terminal of a secondary cell battery to a terminal of a coil and to disconnect them repeatedly in a device for making electric current flow in the coil. FIG. 3 illustrates a rotating component N to be used for passing and blocking the light of another photointerrupter repeatedly in order to connect the negative terminal of a secondary cell battery to another terminal of the coil and to disconnect them repeatedly in a device for making electric current flow in the coil. FIG. 4 is an electronic circuit of a device for making electric current flow in the coil.

As shown in FIG. 1, two permanent magnets (101, 102) are placed to be able to rotate with a shaft and the shaft is placed to be able to rotate with bearings (not shown). A coil (201) is placed outside the circumference of the permanent magnets and the coil is fixed with a fixing means (not shown). A rotating component P (301) and a rotating component N (302) are placed on the shaft and a device (401) for implementing photointerrupters and other electronic components is used to make electric current flow in the coil. Two secondary cell batteries (501, 502) are used to supply DC electric current to the coil.

The permanent magnet-1,2 (101, 102) are placed with 180° of angular separation in which N pole of permanent magnet-1 (101) faces the shaft and S poles of permanent magnet-2 (102) faces the shaft.

The rotating component P (301) is placed on the shaft and the rotating component P (301) passes the light for 20° of angular separation and block the light for 20° of angular separation and pass the light for 10° of angular separation and this process is repeated 3 times and then block the light for 210° of angular separation.

The rotating component N (302) is placed on the shaft and the rotating component N (302) passes the light for 20° of angular separation and block the light for 30° of angular separation and this process is repeated 3 times and then block the light for 210° of angular separation.

The rotating component P (301) is used to connect the positive terminal of secondary cell battery-1 (501) to a terminal (terminal A) of the coil (201) and disconnect them. The rotating component N (302) is used to connect the negative terminal of secondary cell battery-1 (501) to another terminal (terminal B) of the coil (201) and disconnect them.

The rotating component P (301) is used to connect the positive terminal of secondary cell battery-2 (502) to terminal B of the coil (201) and disconnect them. The rotating component N (302) is used to connect the negative terminal of secondary cell battery-2 (502) to terminal A of the coil (201) and disconnect them.

The photointerrupter-1 (11) and the photointerrupter-2 (12) are set to pass the light of photointerrupter-1 (11) and photointerrupter-2 (12) and then block the light of photointerrupter-1 (11) and photointerrupter-2 (12) and then pass the light of photointerrupter-1 (11) by the rotating component P (301) and the rotating component N (302) as permanent magnet-1 (101) faces a side (L side) of the coil (201).

The photointerrupter-3 (21) and the photointerrupter-4 (22) are set to pass the light of photointerrupter-3 (21) and photointerrupter-4 (22) and then block the light of photointerrupter-3 (21) and photointerrupter-4 (22) and then pass the light of photointerrupter-3 (21) by the rotating component P (301) and the rotating component N (302) as permanent magnet-2 (102) faces the L side of the coil (201).

The device (401) makes electric current flow in the coil (201) by changing the direction of electric current alternately. As shown in FIG. 4, if permanent magnet-1 (101) faces the L side of the coil (201), then the light of photointerrupter-1 (11) and photointerrupter-2 (12) is passed through, P channel FET-1 (13) and N channel FET-1 (14) are turned on, electrons flow from the negative terminal of secondary cell battery-1 (501) to the positive terminal of secondary cell battery-1 (501) and the coil (201) activates. Then after a while if the light of photointerrupter-1 (11) and photointerrupter-2 (12) is blocked, then P channel FET-1 (13) and N channel FET-1 (14) are turned off and electrons do not flow from the negative terminal of secondary cell battery-1 (501) to the positive terminal of secondary cell battery-1 (501). At this time, back-emf occurs to the coil (201) and electrons flow from the positive terminal of secondary cell battery-2 (502) to the negative terminal of secondary cell battery-2 (502). Then after a while if the light of photointerrupter-1 (11) is passed, then P channel FET-1 (13) is turned on and electrons which are held in the coil (201) flow to the positive terminal of secondary cell battery-1 (501). And by back-emf which occurs to the coil (201) electrons flow from the positive terminal of secondary cell battery-2 (502) to the negative terminal of secondary cell battery-2 (502). The above routine is repeated 3 times while permanent magnet-1 (101) faces the L side of the coil (201). If permanent magnet-2 (102) faces the L side of the coil (201), then the light of photointerrupter-3 (21) and photointerrupter-4 (22) is passed through, P channel FET-2 (23) and N channel FET-2 (24) are turned on, electrons flow from the negative terminal of secondary cell battery-2 (502) to the positive terminal of secondary cell battery-2 (502) and the coil (201) activates. Then after a while if the light of photointerrupter-3 (21) and photointerrupter-4 (22) is blocked, then P channel FET-2 (23) and N channel FET-2 (24) are turned off and electrons do not flow from the negative terminal of secondary cell battery-2 (502) to the positive terminal of secondary cell battery-2 (502). At this time, back-emf occurs to the coil (201) and electrons flow from the positive terminal of secondary cell battery-1 (501) to the negative terminal of secondary cell battery-1 (501). Then after a while if the light of photointerrupter-3 (21) is passed, then P channel FET-2 (23) is turned on and electrons which are held in the coil (201) flow to the positive terminal of secondary cell battery-2 (502). And by back-emf which occurs to the coil (201) electrons flow from the positive terminal of secondary cell battery-1 (501) to the negative terminal of secondary cell battery-1 (501). The above routine is repeated 3 times while permanent magnet-2 (102) faces the L side of the coil (201).

As permanent magnet-1 (101) faces the L side of the coil (201) as shown in FIG. 1, secondary cell battery-1 (501) is discharged and electric current flows in the coil (201). By back-emf which occurs to the coil (201), electric current flows in the coil (201) and secondary cell battery-2 (502) is charged. While electric current flows in the coil (201), permanent magnets rotate clockwise and so permanent magnet-2 (102) faces the L side of the coil (201).

As permanent magnet-2 (102) faces the L side of the coil (201), secondary cell battery-2 (502) is discharged and electric current flows in the coil (201). By back-emf which occurs to the coil (201), electric current flows in the coil (201) and secondary cell battery-1 (501) is charged. While electric current flows in the coil (201), permanent magnets rotate clockwise and so permanent magnet-1 (101) faces the L side of the coil (201).

Namely, by using two secondary cell batteries (501, 502) and changing the direction of electric current of the coil (201) alternately, permanent magnets rotate continuously and the secondary cell batteries (501, 502) are charged by back-emf which occurs to the coil (201).

If permanent magnets rotate clockwise without using two secondary cell batteries (501, 502), then secondary cell battery-2 (502) is charged as permanent magnet-1 (101) faces the L side of the coil (201) and secondary cell battery-1 (501) is charged as permanent magnet-2 (102) faces the L side of the coil (201).

According to the present invention, two permanent magnets and a coil and two secondary cell batteries are used to rotate a shaft and the power consumption of secondary cell batteries can be reduced by using back-emf which occurs to the coil. Also, the secondary cell batteries are charged by the rotating permanent magnets if the shaft rotates without using the secondary cell batteries. The present invention can be used in various areas such as electric cars, electric airplanes, electric boats, electric bicycles, drones, etc.

The present invention is not limited to the embodiments of the present invention that are described herein and it should be clear to those who have general knowledge in the technical area related to the present invention that various changes can be made without departing from the scope of the technical thoughts of the present invention.

What is claimed is:

1. An apparatus for operating as DC (direct current) generator, comprising:
    permanent magnets which are placed to be able to rotate with a shaft, wherein N pole of one of the permanent magnets faces the shaft and S pole of another of the permanent magnets faces the shaft;
    a coil which is placed outside the circumference of the permanent magnets;
    secondary cell batteries which are connected to the coil, wherein:
    a cathode of a first diode is connected to a positive terminal of a first one of the secondary cell batteries and an anode of the first diode is connected to a terminal A of the coil,
    a cathode of a second diode is connected to a terminal B of the coil and an anode of the second diode is connected to a negative terminal of the first secondary cell battery,
    a cathode of a third diode is connected to a positive terminal of a second one of the secondary cell batteries and an anode of the third diode is connected to the terminal B of the coil, and
    a cathode of a fourth diode is connected to the terminal A of the coil and an anode of the fourth diode is connected to a negative terminal of the second secondary cell battery.

2. The apparatus of claim 1, further comprising:
    a secondary cell battery which is connected to the coil, wherein:
    the cathode of the first diode is connected to a positive terminal of the secondary cell battery and the anode of the first diode is connected to the terminal A of the coil,
    the cathode of the second diode is connected to the terminal B of the coil and the anode of the second diode is connected to a negative terminal of the secondary cell battery,
    the cathode of the third diode is connected to the positive terminal of the secondary cell battery and the anode of the third diode is connected to the terminal B of the coil, and
    the cathode of the fourth diode is connected to the terminal A of the coil and the anode of the fourth diode is connected to the negative terminal of the secondary cell battery;
    a rotating component which is provided on the shaft and used to repeatedly pass and block light of a photointerrupter; and
    a device for making electric current flow in the coil,
    wherein the positive terminal of the secondary cell battery and the terminal A of the coil are connected through a first P channel FET switch, the terminal B of the coil and the negative terminal of the secondary cell battery are connected through a first N channel FET switch,
    wherein the FET switches are turned on as the light of the photointerrupter is passed by the rotating component and the FET switches are turned off as the light of the photointerrupter is blocked by the rotating component,
    wherein the FET switches are set to turn-on to make electric current flow in the coil at a position where the first permanent magnet starts to face a side L of the coil, and
    wherein the following routine A is performed as the rotating component rotates,
    routine A: ① both the first P channel FET switch and the first N channel FET switch are turned on, and the coil is activated by the secondary cell battery, and ② both the first P channel FET switch and the first N channel FET switch are turned off,
    wherein electrons flow from the positive terminal of the secondary cell battery to the terminal B of the coil and flow from the terminal A of the coil to the negative terminal of the secondary cell battery by back-emf which occurs in the coil, and
    wherein the routine A is repeated while the first permanent magnet faces the L side of the coil.

3. The apparatus of claim 1, further comprising:
    a rotating component P which is provided on the shaft and used to repeatedly pass and block light of a first photointerrupter to repeatedly connect and disconnect the positive terminal of the first secondary cell battery to and from the terminal A of the coil, and can be used to repeatedly pass and block light of the first photointerrupter to repeatedly connect and disconnect the negative terminal of the first secondary cell battery to and from the terminal B of the coil, and used to repeatedly pass and block light of a third photointerrupter to repeatedly connect and disconnect the positive terminal of the second secondary cell battery to and from the terminal B of the coil, and can be used to repeatedly pass and block light of the third photointerrupter to repeatedly connect and disconnect the negative terminal of the second secondary cell battery to and from the terminal A of the coil;
    a rotating component N which is provided on the shaft and used to repeatedly pass and block light of a second photointerrupter to repeatedly connect and disconnect the negative terminal of the first secondary cell battery to and from the terminal B of the coil, and used to repeatedly pass and block light of a fourth photointerrupter to repeatedly connect and disconnect the negative terminal of the second secondary cell battery to and from the terminal A of the coil; and a device for making electric current flow in the coil, wherein the positive terminal of the first secondary cell battery and the terminal A of the coil are connected through a first P channel FET switch, the terminal B of the coil and the negative terminal of the first secondary cell battery are connected through a first N channel FET switch, the positive terminal of the second secondary cell battery and the terminal B of the coil are connected through a second P channel FET switch, and the terminal A of the coil and the negative terminal of the second secondary cell battery are connected through a second N channel FET switch, wherein the first P channel FET switch is turned on as the light of the first photointerrupter is passed by the rotating component P and the first P channel FET switch is turned off as the light of the first photointerrupter is blocked by the rotating component P, the first N channel FET switch is turned on as the light of the second photointerrupter is passed by the rotating component N and the first N channel FET switch is turned off as the light of the second photointerrupter is blocked by the rotating component N, the first N channel FET switch can be turned on as the light of the first photointerrupter is passed by the rotating component P and the first N channel FET switch can be turned off as the light of the first photointerrupter is blocked by the rotating component P, the second P channel FET switch is turned on as the light of the third photointerrupter is passed by the rotating component P and the second P channel FET switch is turned off as the light of the third photointerrupter is blocked by the rotating component P, the second N channel FET switch is turned on as the light of the fourth photointerrupter is passed by the rotating component N and the second N channel FET switch is turned off as the light of the fourth photointerrupter is blocked by the rotating component N, the second N channel FET switch can be turned on as the light of the third photointerrupter is passed by the rotating component P and the second N channel FET switch can be turned off as the light of the third photointerrupter is blocked by the rotating component P, wherein the first P channel FET switch and the first N channel FET switch are set to turn-on to make electric current flow in the coil at a position where the first permanent magnet starts to face a side L of the coil, wherein the second P channel FET switch and the second N channel FET switch are set to turn-on to make electric current flow in the coil at a position where the second permanent magnet starts to face the L side of the coil, and wherein the following routines A and B are alternately performed as the rotating components P and N rotate, routine A: ① both the first P channel FET switch and the first N channel FET switch are turned on, and the coil is activated by the first secondary cell battery, and ② both the first P channel FET switch and the first N channel FET switch are turned off, wherein electrons flow from the positive terminal of the second secondary cell battery to the terminal B of the coil and flow from the terminal A of the coil to the negative terminal of the second secondary cell battery by back-emf which occurs in the coil, and wherein the routine A is repeated while the first permanent magnet faces the L side of the coil, and routine B: ① both the second P channel FET switch and the second N channel FET switch are turned on, and the coil is activated by the second secondary cell battery, and ② both the second P channel FET switch and the second N channel FET switch are turned off, wherein electrons flow from the positive terminal of the first secondary cell battery to the terminal A of the coil and flow from the terminal B of the coil to the negative terminal of the first secondary cell battery by back-emf which occurs in the coil, and wherein the routine B is repeated while the second permanent magnet faces the L side of the coil.

* * * * *